United States Patent
Arana

(10) Patent No.: US 10,181,040 B2
(45) Date of Patent: Jan. 15, 2019

(54) ALTERNATE CONTENT PLAYLIST FOR LOCKED MEDIA CONTENT

(71) Applicant: Disney Enterprises, Inc., Burbank, CA (US)

(72) Inventor: Mark Arana, Burbank, CA (US)

(73) Assignee: DISNEY ENTERPRISES, INC., Burbank, CA (US)

(*) Notice: Subject to any disclaimer, the term of this patent is extended or adjusted under 35 U.S.C. 154(b) by 0 days.

(21) Appl. No.: 14/139,691

(22) Filed: Dec. 23, 2013

(65) Prior Publication Data

US 2015/0026820 A1    Jan. 22, 2015

Related U.S. Application Data

(60) Provisional application No. 61/856,459, filed on Jul. 19, 2013.

(51) Int. Cl.
 *G06F 21/60*  (2013.01)
 *G06F 21/10*  (2013.01)

(52) U.S. Cl.
 CPC .............. *G06F 21/60* (2013.01); *G06F 21/10* (2013.01)

(58) Field of Classification Search
 CPC .................................. G06F 21/10; G06F 21/60
 USPC ........................................................... 726/27
 See application file for complete search history.

(56) References Cited

U.S. PATENT DOCUMENTS

| | | | |
|---|---|---|---|
| 2005/0198115 A1* | 9/2005 | Sugimoto et al. | ............ 709/203 |
| 2006/0085814 A1 | 4/2006 | Okamoto et al. | |
| 2007/0198839 A1 | 8/2007 | Carle et al. | |
| 2007/0283420 A1 | 12/2007 | Rantalahti | |
| 2008/0010372 A1* | 1/2008 | Khedouri | .......... G06F 17/30094 709/224 |
| 2009/0125812 A1 | 5/2009 | Blinnikka et al. | |
| 2009/0214042 A1* | 8/2009 | Nakahara | ................ G06F 21/10 380/278 |
| 2009/0293083 A1 | 11/2009 | Gordon et al. | |
| 2010/0268836 A1 | 10/2010 | Jabri et al. | |
| 2012/0257878 A1* | 10/2012 | Fujimura | ...................... 386/291 |

FOREIGN PATENT DOCUMENTS

| | | |
|---|---|---|
| EP | 1553769 A1 | 7/2005 |
| GB | 2479455 A | 10/2011 |
| JP | 2009217332 A | 9/2009 |

(Continued)

OTHER PUBLICATIONS

European Patent Office, Extended European Search Report for EP 14177389.5, dated Nov. 18, 2014, pp. 1-7.

(Continued)

*Primary Examiner* — Dao Q Ho

(74) *Attorney, Agent, or Firm* — Sheppard Mullin Richter & Hampton LLP

(57) ABSTRACT

Systems, and methods disclosed herein include systems and methods for providing alternative content playlists for locked media content. Media content may be locked according to certain pre-conditions, such as a release date. Prior to the pre-conditions being met, e.g., on a date earlier than the release date, the content may be locked to prevent user access. During such locked period, a user may be presented with an alternative content playlist with media content that is available to be accessed by the user.

18 Claims, 5 Drawing Sheets

(56) References Cited

FOREIGN PATENT DOCUMENTS

| | | |
|---|---|---|
| WO | 2004030356 A1 | 4/2004 |
| WO | 2008/044172 A2 | 4/2008 |
| WO | 2010107490 A1 | 9/2010 |
| WO | 2012166813 A1 | 12/2012 |

OTHER PUBLICATIONS

State Intellectual Property Office of PRC, Notification of First Office Action, dated Feb. 4, 2017, pp. 1-7.
Office Action in Japanese Patent Application No. 2014-147475, dated May 15, 2018.

* cited by examiner

LOCAL TIME-BASED CONDITION METHOD

NETWORK-BASED METHOD WITH
TIME-BASED CONDITION

NETWORK-BASED METHOD WITH TIME-BASED CONDITION AND CUSTOMIZED PLAYLIST

ALTERNATE CONTENT PLAYLIST FOR LOCKED MEDIA CONTENT

CROSS-REFERENCE TO RELATED APPLICATIONS

This application claims the benefit of U.S. Provisional Application No. 61/856,459, filed Jul. 19, 2013, which is incorporated herein by reference as if fully set forth herein.

TECHNICAL FIELD

The present disclosure relates generally to features of locked media content, and, more particularly, to providing an alternate content playlist when a user attempts to access locked media content.

DESCRIPTION OF THE RELATED ART

Media content can be delivered to users in a variety of ways, including, but not limited to, physical delivery methods, e.g., compact discs, DVDs, Blu-ray discs, and USB flash drives, hard drives, or electronic delivery methods, e.g., electronic file transfers, streaming media, or downloads. File encryption and decryption methods allow for content providers to distribute content securely and only allow authorized users to access the content.

BRIEF SUMMARY OF THE DISCLOSURE

According to various embodiments, the systems and methods described herein describes systems and methods for providing alternate content playlists for locked media content.

The present disclosure may be embodied in a method of handling condition-locked media. The method may comprise determining whether one or more conditions has been satisfied for a media content asset to be played by a media player; and, if the one or more playback conditions have been satisfied, playing the media content asset, or, if the one or more playback conditions have not been satisfied, playing an alternative media content playlist.

The one or more playback conditions may comprise a time-based condition such that the media content asset cannot be played prior to a specified time. The specified time may be a release date, wherein determining whether one or more conditions has been satisfied comprises determining whether the specified release date has passed. The one or more playback conditions may also comprise a geographic condition and/or a user-based condition.

In one aspect, playing an alternative media content playlist may further comprise gathering information to compile a customized alternative media content playlist, and playing the customized alternative media content playlist. The information gathered to compile the customized alternative media content playlist may comprise one or more of the following: information identifying the media content asset, date information, time information, geographic information, media player information, and/or user viewing preference information.

The alternative media content playlist may comprise one or more alternative media content assets that are available locally to the media player.

The alternative media content playlist may comprise one or more alternative media content assets that are received on the media player over a network. The network may be a wide area network.

The present disclosure may also be embodied in a method of handling condition-locked media comprising sending information about a media content asset to be played by a media player to a remote server over a network, the media content asset having one or more playback conditions; receiving a playback condition communication from the remote server; and, if the playback condition communication indicates that the one or more playback conditions have been satisfied, playing the media content asset, or, if the playback condition communication indicates that the one or more playback conditions have not been satisfied, playing an alternative media content playlist.

The one or more playback conditions may comprise any of a time-based condition, a geographic condition, and/or a user-based condition. The network may be a wide area network.

Playing the alternative media content playlist may further comprise gathering information to compile a customized alternative media content playlist, and playing the customized alternative media content playlist. The information gathered to compile the customized alternative media content playlist may comprise one or more of the following: information identifying the media content asset, date information, time information, geographic information, media player information, and/or user viewing preference information.

The media content playlist may comprise alternative media content assets that are available locally to the media player, and/or alternative media content assets that are received on the media player over the network. The alternative media content playlist may comprise one or more alternative media content assets that are available for purchase over the network.

In another aspect, the playback condition communication may be used to determine whether the one or more playback conditions have been satisfied. Alternatively, the playback condition communication may indicate whether or not the one or more playback conditions have been satisfied.

The present disclosure may also be embodied in a non-transitory computer-readable media having an instruction set configured to cause a computing device to perform the methods disclosed above.

Other features and aspects of the disclosure will become apparent from the following detailed description, taken in conjunction with the accompanying drawings, which illustrate, by way of example, the features in accordance with various implementations.

BRIEF DESCRIPTION OF THE DRAWINGS

The drawings are provided for purposes of illustration only and merely depict typical or example implementations. These drawings are provided to facilitate the reader's understanding and shall not be considered limiting of the breadth, scope, or applicability of the disclosure. For clarity and ease of illustration, these drawings are not necessarily to scale.

DETAILED DESCRIPTION

The disclosure provided herein describes systems and methods for providing alternate content playlists for locked media content.

Figure 1:
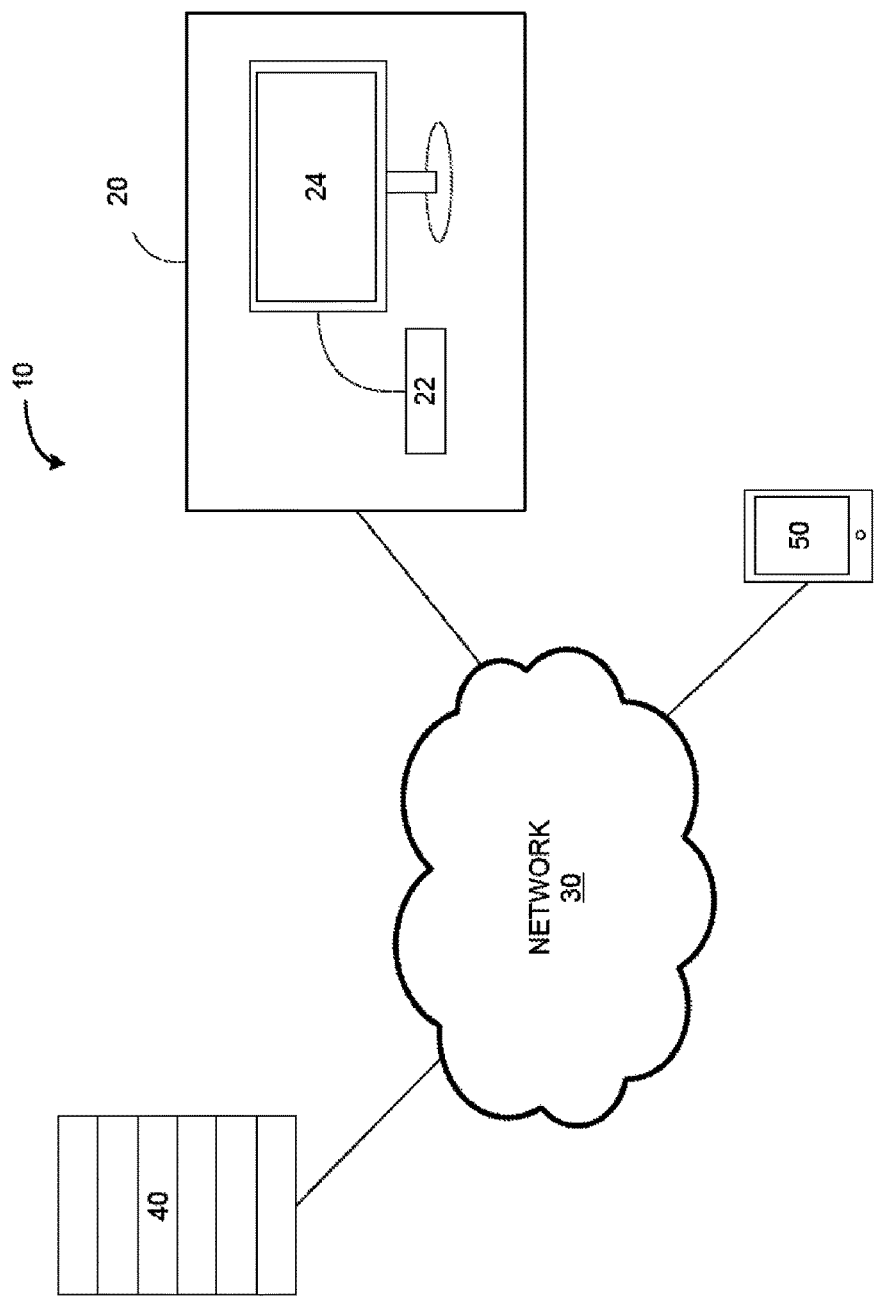
FIG. 1 is a block diagram of a locked media content system, in accordance with an embodiment of the present disclosure.

FIG. 1 provides a block diagram of a locked media content system 10, in accordance with an embodiment of the present disclosure. The system 10 may comprise a content player 20. The content player 20 may comprise a content reader 22 and a content output 24. In FIG. 1, the content player 20 is depicted as a home entertainment system, with a content reader 22, such as a Blu-ray disc player, and a content output 24, such as a television. Alternatively, the content player 20 may be a single device comprising both a content reader and a content output, such as the tablet-style content player 50. The content player 20 may be any appropriate device that is able to play media content for a user. This may include, but is not limited to, home entertainment systems, DVD players, Blu-ray players, televisions, MP3 players, mobile phones, smart phones, tablet computing devices, other mobile devices, gaming consoles, personal computers, laptop computers, etc.

The content player 20 may be connected to a network 30. The network 30 may be a wide-area network, such as the internet, or a local-area network, or anything in between. The network 30 may comprise cellular, WiFi, other wireless, wired, and/or cable components. Also connected to the network 30 is a remote server 40.

The content player 20 is used to play media content. This media content may be any electronic media content, including, but not limited to, written content (e.g., books or articles), video content, audio content, images, games, etc. The present disclosure deals with handling locked media content. Locked media content may comprise any media content that requires one or more conditions to be satisfied before a user may access the content. Common examples of such conditions might include conditions such as a date condition (e.g., content may only be played after a particular date), a geographic condition (e.g., content may only be played within a certain geographic region), a user condition (e.g., a password must be entered to identify the user before content can be played), or any other condition that might be used to limit access to media content. The media content may be encrypted so that users are unable to access the content, and then decryption may occur once the one or more pre-determined conditions are met.

The present disclosure allows for an alternative content playlist to be delivered or displayed to the user when a user does not meet the criteria to access the locked media content. A simple example will now be provided to illustrate some of the basic features of the present disclosure. It will be clear to someone of ordinary skill in the art that while the example is discussed in terms of a Blu-ray disc containing movie content having a particular release date, other embodiments may be used that are still within the spirit of the present disclosure.

Movie content is commonly delivered via Blu-ray disc. Blu-ray versions of movies are generally accorded release dates several months after the movie is no longer showing in theaters. Generally, these Blu-ray movies are self-decrypting, or in a playable form, so that if you have the disc, you are able to play its content. However, this generally leads to situations in which counterfeiters are able to obtain early copies of a Blu-ray disc and release copies prior to the Blu-ray release date. As such, it may be preferable to protect the Blu-ray disc such that when the Blu-ray disc is inserted into a Blu-ray player, it can only be played after the release date. In this way, even if someone is able to obtain a copy of a Blu-ray disc prior to the release date, they will not be able to play the disc because the content can only be unlocked after the release date, e.g., the decryption key is only released after the release date. In this example, the release date is a time-based condition on playback of the movie media content, i.e., the media content cannot be played until the condition (today's date must be later than the release date) is met.

Figure 2:
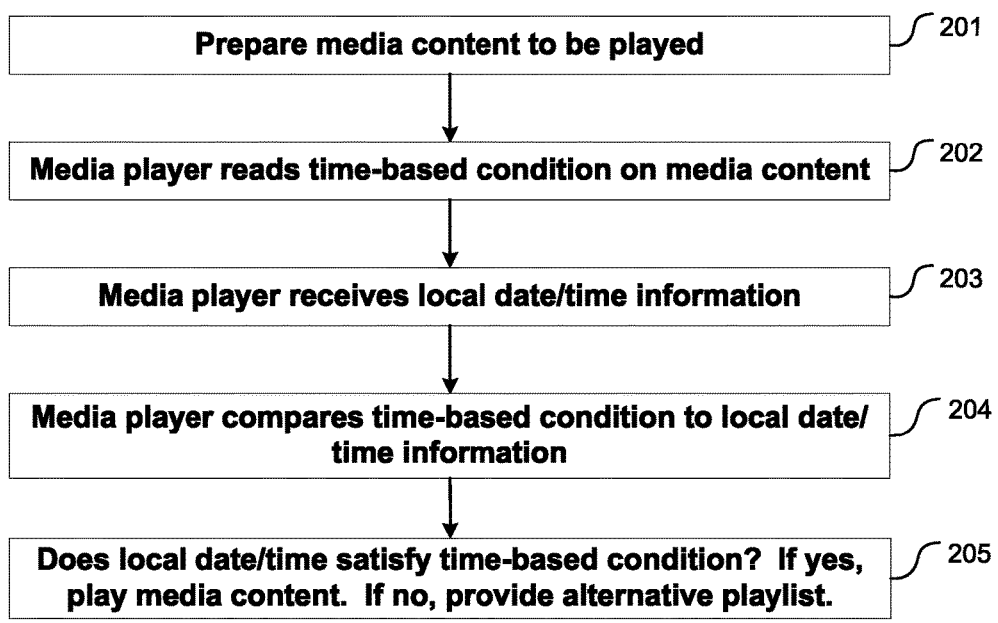
FIG. 2 is a flow chart representing a possible sequence of operations for a local time-based condition method, in accordance with an embodiment of the present disclosure.

To enforce the time-based condition, the system 10 must determine whether or not today's date is after the release date. This may be carried out in multiple ways. FIG. 2 provides a flow chart for an exemplary method of local date/time comparison. In this local method, no connection to the network 30 is required to carry out any of the steps. In step 201, the media content is prepared for playing. In the example of a Blu-ray disc, this may comprise putting the Blu-ray disc into the Blu-ray player. In step 202, the media player reads the media content and reads a time-based condition that has been placed on the media content. In order to determine whether or not the time-based condition has been met, in step 203, the media player receives date/time information that is locally available. This step may comprise the media player reading date/time information from a local clock that is a part of or attached to the media player. The media player then compares the local date/time information to the time-based condition to determine whether or not the condition has been satisfied (step 204). If the condition has been satisfied, e.g., the release date is Jul. 1, 2013, and the current date is Jul. 8, 2013, then the media content is played. However, if the condition is not satisfied, e.g., the current date is Jan. 1, 2013, then the media player provides the user with an alternative playlist of media content that is currently available for purchase or play.

The alternative playlist that is presented to a user may comprise local media content that is stored locally, e.g., on the media player or on a media content disc. In the example of the Blu-ray disc, the alternative playlist may comprise other media content that is stored on the Blu-ray disc, such as movie trailers, games or other special features that are available to the user even before the release date of the movie itself. The alternative playlist may also comprise other media contents that are stored on the user's Blu-ray player or other media player. In this way, the user is able to access certain pieces of content on the Blu-ray disc, but is not able to access other areas, until a particular condition, such as a release date, has been satisfied.

Multiple conditions may be placed onto media content that is stored on a disc or other storage medium. For example, a Blu-ray disc may contain trailers that are available as soon as the user purchases the Blu-ray disc, and special features that are available a week before the movie's Blu-ray release date, and then the movie itself, which is available after the release date.

By implementing the systems and methods disclosed here, media content producers may sell the media content on any given date with the knowledge that the content will only become available on the date that they desire (the release date), or any other condition they may wish to place on the media content. For example, Blu-ray versions of movies may be sold at the theater while the movie is still in theater, but users cannot watch the movie at home on their Blu-ray players until after the release date has passed, so that patrons are still encouraged to watch the movie in theaters while it is available. The alternative content playlist encourages users to view or purchase other media content that is available, even if the "primary" media content may not yet be available. Reward media content may be periodically granted to the user to encourage the user to continue accessing the media content before the playback condition has been met.

Figure 3:
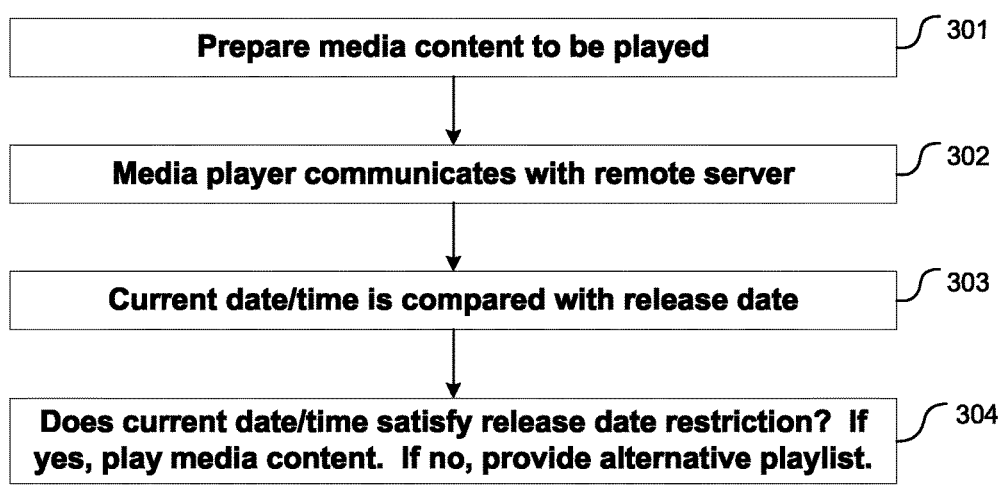
FIG. 3 is a flow chart representing a possible sequence of operations for a network-based method with a time-based condition, in accordance with an embodiment of the present disclosure.

FIG. 3 illustrates a network-based method by which a release date condition may be enforced. In step 301, media content is prepared for playing. The media content may be available locally (e.g., a Blu-ray disc or on the user's computing device), or may be accessed over the network (e.g., download or streaming media content). In step 302, the media player communicates with the remote server. The remote server may store media content condition information, such as a movie's release date. The remote server may receive information identifying the media content that the media player is trying to play, and also information to determine whether or not all conditions on that media content have been satisfied. In the example of a Blu-ray movie with a particular release date, the remote server may receive release date information and current date/time information. This information may be provided by the media player, e.g., the Blu-ray player, or it may be available locally at the remote server, or it may be provided by any other appropriate source (e.g., a reliable third party time-source, such as an atomic clock, connected to the network). In step 303, the current date/time is compared with the release date to determine whether the release date condition has been satisfied. This determination may be performed at the remote server. Alternatively, the relevant information may be transmitted back to the media player so that this determination may be made at the media player. In step 304, if the condition is satisfied, the media is played. If the condition is not satisfied, the user is provided with an alternative playlist.

With regard to the time-based condition, FIG. 2 discussed a purely local time-based condition method, while FIG. 3 provided a network-based method. A combination of local and network-based methods may be used to enforce a time-based condition. For example, if the clock on the local player is unreliable (e.g., the user is able to adjust it), then measures may need to be taken to ensure that the user is not granted early access to the time-locked media content. To ensure that early access is not granted, the user may be provided with a disc having a default manifest, containing one or more pieces of digital media content that can be accessed at any time, as well as additional manifests that are locked based on certain conditions. Content within the default manifest does not require a particular time-based criteria to be met before the content can be accessed. However, in order to access locked manifests having a time-based condition, the user may be required to connect their media player to a network so that the media player can reliably determine whether the time-based conditions have been met, e.g., by accessing a reliable time source over the network.

Manifests may become available to the user as the user takes certain steps. For example, the initial manifest may be available immediately on the user's local media player. An additional manifest may be made available to the user once the user connects the media player to the network. Then a further manifest may be made available to the user once it has been reliably determined that the time-based condition on the locked manifest has been met. Manifests may be provided locally (e.g., via a disc), or may be provided over the network.

In another embodiment, a user's local media player may be able to reliably provide time information with an initial connection to the network, even if it does not remain connected to the network. In this embodiment, the local media player may contain a relative clock that is able to reliably keep track of time as it passes. However, in order to obtain a reliable starting time from which the local media player may continue to track the passage of time, the user may be required to connect the media player to the network so that an accurate time reading can be obtained over the network. From that point on, a connection to the network may not be required, as the local media player can use the initial time data pulled from the network and then determine how much time has passed in order to obtain a reliable current time.

A local media player's relative clock may also be used to unlock media content and/or manifests according to time-based conditions that require a certain passage of time, rather than an absolute release date. For example, a Blu-ray disc may contain three manifests, each of which is unlocked based on different time-based criteria. As was discussed above, these time-based criteria may be based on absolute clocks, such that a particular release date governs when the material is made available. As such, a first manifest having a first set of media content may be made available at a first date and a first time, a second manifest having a second set of media content may be made available at a second date and a second time, and a third manifest having a third set of media content may be made available at a third date and a third time. Alternatively, a relative clock may be used to enforce a relative time-based criteria. In this example, the first manifest on the disc may be made available immediately such that the user can view it the first time they insert the disc. The media player may then use the relative clock to determine the passage of time from the initial insertion of the disc. After a pre-determined amount of time has passed (e.g., 10 days after the initial insertion of the disc), a second manifest on the disc may become available to the user having a second set of media content. In this way, multiple relative time-based criteria may be applied to control when media content is made available to a user.

Rather than using an absolute or relative clock to determine when media content may be unlocked, a release date condition may be enforced using a password condition, such that media content cannot be accessed until the user enters a password. The password could be released on the release date, such that users could not access the locked media content until the password is released on the release date. Further, different passwords may unlock different manifests.

In FIG. 2, an alternative playlist is provided to the user if it is determined that the condition to unlock a particular piece of media content has not been satisfied. A connection to a network, as discussed in FIG. 3 and demonstrated in FIG. 1, allows for additional content to be sent to the user over the network, in addition to, or in place of, any alternative content that is provided locally. For example, if a user attempts to play media content for which the playback condition is not satisfied, then the user may automatically be presented with a selection of media content options that are available for viewing or for purchase over the network. The alternative content may be content that the user already owns, or that is available to be viewed for free, or that is available for purchase and then viewing.

The alternative content that is provided to a user may be a default set of content that is the same for all users, or it may be altered based on a number of factors. For example, a user's viewing habits may be inspected to determine certain content that may be of more interest to a user. If a user tends to watch a large number of action films, then alternative media content within the action genre may be presented to the user. The user's location may be used to determine location-specific content, such as advertisements for local attractions. The alternative playlist may also include media content that relates to the locked media content for which the access condition has not been met. For example, if a user is attempting to play a new movie, but the release date has not yet been reached, then the user may be provided with trailers for sequels and/or prequels of the movie, trailers for the movie itself, prequels and/or sequels to the movie that the user already owns or that may be purchased by the user, pre-release bonus features for the movie, fan art or photograph stills from the movie, etc.

Figure 4:
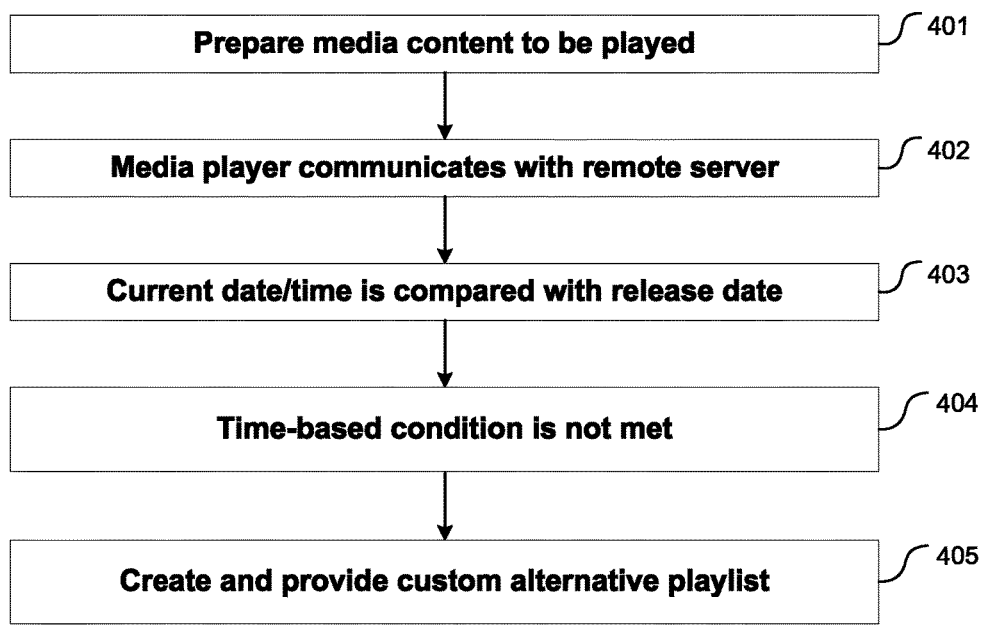
FIG. 4 is a flow chart representing a possible sequence of operations for supplying a customized alternative playlist, in accordance with an embodiment of the present disclosure.

FIG. 4 provides a flow chart for customized alternative playlist delivery. Steps 401-403 correspond with steps 301-303 of FIG. 3. In step 404, the date/time condition is not satisfied. As such, in step 405, a custom alternative playlist is provided to the user. The custom alternative playlist may be based on several variables. For example, the media content provided in the custom alternative playlist may be based on the date and time (e.g., previews for movies that are currently in theaters), location (e.g., commercials for or information on local attractions), the playback device (e.g., if the device is a gaming console, advertisements for games on the console), additional content available on the content delivery medium (e.g., the other available content on the Blu-ray disc), additional content available locally on the user's media player (e.g., content stored on the user's Blu-ray player), the screen resolution of the media player (e.g., provide standard definition or high definition content based on media player), or the like. The customer alternative playlist may also be based on the user's viewing preferences, such that media content is provided to the user that is related to or similar to other media content the user has viewed previously, or content within the same genre or otherwise relating to the media content the user tried to access, but for which the playback condition has not been met. The contents of the alternative playlist may reference content locally available on the disc, content local to the media player (e.g., hard drive, SD card, USB drive, etc.), content that is remote from the media player and available via the network, or any other content that can be made available to the media player.

While the playback condition that has been discussed to this point has focused on a date/time condition, i.e., a release date, it will be understood that the playback condition may be any of one or more conditions that a media content producer may want to place on their content. Some examples might include a geographic condition (e.g., content may only be played within a certain geographic region), a user condition (e.g., a password must be entered to identify the user before content can be played), or any other condition that might be used to limit access to media content. Another example might be a use-based condition, such that accessing a certain amount of content or for accessing content for a certain period of time will qualify the user for additional content, so as to encourage the user to view more content. The information used to determine whether or not a condition has been met may be information that is available over the network 30, possibly on the remote server 40, information that is available locally to the media player 20, information entered by the user, or any other information that is available to the system 10. As was discussed above, this information may be provided to the media player 20 to make the determination as to whether or not the conditions have been met. Alternatively, the information may be provided to the remote server 40 to determine whether or not the conditions have been met. If the playback determination is made at the remote server 40, then the remote server 40 may communicate a signal to the media player instructing the media player to play the media content, if the conditions are met, or instructing the media player not to play the media content, resulting in the display of an alternative content playlist, if the conditions are not met.

As used herein, the term module might describe a given unit of functionality that can be performed in accordance with one or more implementations. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the disclosed system are implemented in whole or in part using software, in one embodiment, these software elements can be implemented to operate with a computing or processing module capable of carrying out the functionality described with respect thereto. After reading this description, it will become apparent to a person skilled in the relevant art how to implement the disclosure using other computing modules or architectures.

Figure 5:
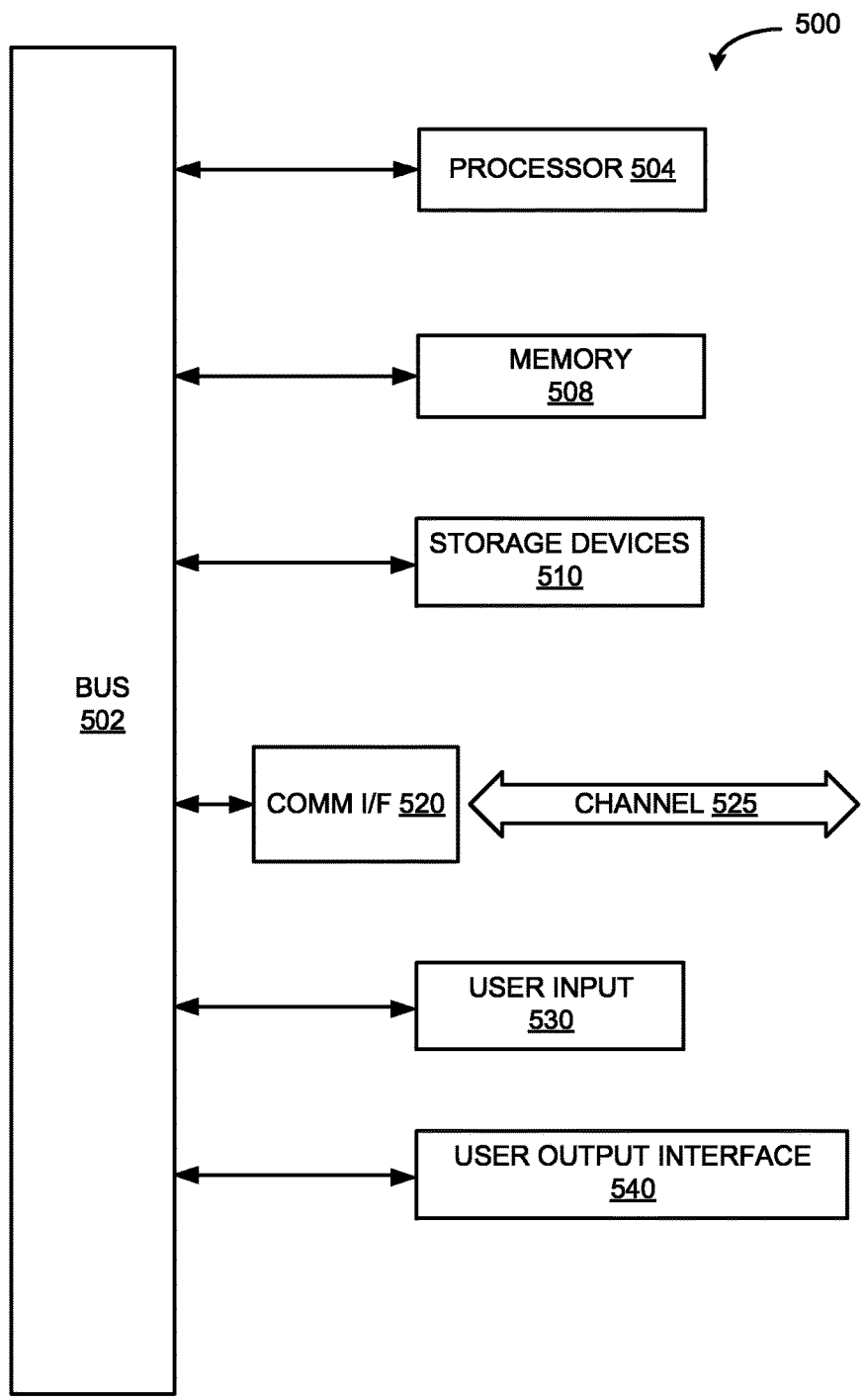
FIG. 5 illustrates an example computing module that may be used in implementing various features of the present disclosure.

Referring now to FIG. 5, computing module 500 may represent, for example, computing or processing capabilities found within desktop, laptop and notebook computers; hand-held computing devices (PDA's, smart phones, cell phones, palmtops, tablets, etc.); or any other type of special-purpose or general-purpose computing devices as may be appropriate. Computing module 500 might also represent computing capabilities embedded within or otherwise available to a given device. For example, a computing module might be found in other electronic devices such as, for example, televisions, home theaters, Blu-ray disc players, DVD players, in-car entertainment systems, video game consoles, video download or streaming devices, portable DVD players. and other electronic devices that might include some form of processing capability.

Computing module 500 might include, for example, one or more processors, controllers, control modules, or other processing devices, such as a processor 504. Processor 504 might be implemented using a general-purpose or special-purpose processing engine such as, for example, a microprocessor, controller, or other control logic. In the illustrated example, processor 504 is connected to a bus 502, although any communication medium can be used to facilitate interaction with other components of computing module 500 or to communicate externally.

Computing module 500 might also include one or more memory modules, simply referred to herein as main memory 508. Memory may include any non-transitory storage medium. For example, preferably random access memory (RAM) or other dynamic memory, might be used for storing information and instructions to be executed by processor 504. Main memory 508 might also be used for storing temporary variables or other intermediate information during execution of instructions to be executed by processor 504. Computing module 500 might likewise include a read only memory ("ROM") or other static storage device coupled to bus 502 for storing static information and instructions for processor 504. The computing module 500 might also include one or more various forms of information storage mechanism 510, which might include, for example, a magnetic tape drive, an optical disc drive, a solid state drive, or any other non-volatile memory.

Computing module 500 might also include a communications interface 520. Communications interface 520 might be used to allow software and data to be transferred between computing module 500 and external devices. Examples of communications interface 520 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 520 might typically be carried on signals, which can be electronic, electromagnetic (which includes optical) or other signals capable of being exchanged by a given communications interface 520. These signals might be provided to communications interface 520 via a channel 525. This channel 525 might carry signals and might be implemented using a wired or wireless communication medium. Some examples of a channel might include a phone line, a cellular link, an RF link, an optical link, a network interface, a local or wide area network, and other wired or wireless communications channels.

Computing module 500 might also include one or more user inputs 530. The user input allows for the user to enter commands to the computing module 500 and interact with it. Examples of user inputs might include a computer mouse, a keyboard, a touch-sensitive screen, a mousepad, a joystick, or any other user input mechanism. The computer module 500 might also include one or more user output interfaces 540. This interface might be used to interact with the user by presenting information our sensory outputs for the user. Examples of user output interfaces might include visual outputs, such as a display screen or monitor, or audio outputs, such as a speaker or headphone output.

In this document, the terms "computer program medium" and "computer usable medium" are used to generally refer to media such as, for example, memory 508, storage unit 510, and channel 525. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 500 to perform features or functions of the present disclosure as discussed herein.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features. Additionally, with regard to flow diagrams, operational descriptions and method claims, the order in which the steps are presented herein shall not mandate that various embodiments be implemented to perform the recited functionality in the same order unless the context dictates otherwise. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

Although the disclosure has been presented with reference only to the presently preferred embodiments, those of ordinary skill in the art will appreciate that various modifications can be made without departing from this disclosure.

The invention claimed is:

1. A method of handling condition-locked media, the method comprising:
determining whether one or more playback authorization conditions has been satisfied for a primary media content asset to be played by a media player;
playing the primary media content asset when the one or more playback authorization conditions have been satisfied; and
providing a customized alternative media content playlist to a user when the one or more playback authorization conditions have not been satisfied, wherein the customized alternative media content playlist comprises one or more media content assets accessible by the user immediately in lieu of the primary media content asset, wherein providing the customized alternative media content playlist comprises:
gathering information to compile the customized alternative media content playlist, the information gathered comprising information regarding the primary media content asset, information regarding one or more reasons why the one or more playback authorization conditions have not been satisfied, and user viewing preference information; and using the information gathered to compile the customized alternative media content playlist, such that the one or more media content assets of the customized alternative media content playlist are selected based on the information regarding the primary media content asset, the information regarding one or more reasons why the one or more playback authorization conditions have not been satisfied, and the user viewing preference information.

2. The method of claim 1, wherein the one or more playback authorization conditions comprises a time-based condition such that the primary media content asset cannot be played prior to a specified time.

3. The method of claim 2, wherein the specified time is a specified release date, and further wherein, determining whether one or more playback authorization conditions has been satisfied comprises determining whether the specified release date has passed.

4. The method of claim 1, wherein the one or more playback authorization conditions comprises a geographic condition.

5. The method of claim 1, wherein the one or more playback authorization conditions comprises a user-based condition.

6. The method of claim 1, wherein the information gathered to compile the customized alternative media content playlist comprises one or more of the following:

information identifying the media content asset, date information relative to a date upon which the one or more playback authorization conditions is premised, time information upon which the one or more playback authorization conditions is premised, geographic information upon which the one or more playback authorization conditions is premised, and media player information upon which the one or more playback authorization conditions is premised.

7. The method of claim 1, further comprising sending information about the primary media content asset to be played by the media player to a remote server over a wide area network.

8. A method of handling condition-locked media, the method comprising:

sending information about a primary media content asset to be played by a media player to a remote server over a network, the primary media content asset having one or more playback authorization conditions;

receiving a playback authorization condition communication from the remote server;

playing the primary media content asset when the playback authorization condition communication indicates that the one or more playback authorization conditions have been satisfied;

providing a customized alternative media content playlist to a user when the playback authorization condition communication indicates that the one or more playback authorization conditions have not been satisfied, wherein the customized alternative media content playlist comprises one or more media content assets accessible by the user immediately in lieu of the primary media content asset, wherein providing the customized alternative media content playlist comprises:

gathering information to compile the customized alternative media content playlist, the information gathered comprising information regarding the primary media content asset, information regarding one or more reasons why the one or more playback authorization conditions have not been satisfied, and user viewing preference information: and using the information gathered to compile the customized alternative media content playlist, such that the one or more media content assets of the customized alternative media content playlist are selected based on the information regarding the primary media content asset, the information regarding one or more reasons why the one or more playback authorization conditions have not been satisfied, and the user viewing preference information.

9. The method of claim 8, wherein the one or more playback authorization conditions comprises a time-based condition such that the primary media content asset cannot be played prior to a specified time.

10. The method of claim 8, wherein the one or more playback authorization conditions comprises a geographic condition.

11. The method of claim 8, wherein the one or more playback authorization conditions comprises a user-based condition.

12. The method of claim 8, wherein the information gathered to compile the customized alternative media content playlist comprises one or more of the following: information identifying the media content asset, date information relative to a date upon which the one or more playback authorization conditions is premised, time information upon which the one or more playback authorization conditions is premised, geographic information upon which the one or more playback authorization conditions is premised, and media player information upon which the one or more playback authorization conditions is premised.

13. The method of claim 8, wherein the customized alternative media content playlist comprises one or more alternative media content assets that are available locally to the media player.

14. The method of claim 8, wherein the customized alternative media content playlist comprises one or more alternative media content assets that are received on the media player over the network.

15. The method of claim 14, wherein the customized alternative media content playlist comprises one or more alternative media content assets that are available for purchase over the network.

16. The method of claim 8, wherein the network is a wide area network.

17. The method of claim 8, further comprising using the playback condition communication to determine whether the one or more playback authorization conditions have been satisfied.

18. The method of claim 8, wherein the playback authorization condition communication indicates whether or not the one or more playback authorization conditions have been satisfied.

* * * * *